US011550933B2

(12) United States Patent
Nagao et al.

(10) Patent No.: US 11,550,933 B2
(45) Date of Patent: Jan. 10, 2023

(54) ENHANCED SECURITY SYSTEMS AND METHODS USING A HYBRID SECURITY SOLUTION

(71) Applicant: Intertrust Technologies Corporation, Sunnyvale, CA (US)

(72) Inventors: Yutaka Nagao, San Jose, CA (US); Stephen G. Mitchell, Ben Lomond, CA (US); Vishisht Tiwari, Sunnyvale, CA (US); Rohaan Advani, San Francisco, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 128 days.

(21) Appl. No.: 17/196,743

(22) Filed: Mar. 9, 2021

(65) Prior Publication Data

US 2021/0390189 A1 Dec. 16, 2021

Related U.S. Application Data

(60) Provisional application No. 63/039,282, filed on Jun. 15, 2020.

(51) Int. Cl.
*G06F 21/60* (2013.01)
*H04L 9/08* (2006.01)
*H04L 9/32* (2006.01)

(52) U.S. Cl.
CPC .......... *G06F 21/602* (2013.01); *H04L 9/0825* (2013.01); *H04L 9/0894* (2013.01); *H04L 9/3247* (2013.01); *H04L 2209/16* (2013.01)

(58) Field of Classification Search
CPC .......... G06F 21/602; G06F 2221/2107; H04L 9/0825; H04L 9/0894; H04L 9/3247;
(Continued)

(56) References Cited

U.S. PATENT DOCUMENTS

2003/0154376 A1* 8/2003 Hwangbo ............... H04L 9/006
713/173
2013/0091353 A1* 4/2013 Zhang .................... H04L 9/3268
713/156

(Continued)

OTHER PUBLICATIONS

On Data Banks arid Privacy Homomorphisms. Rivest, Adleman, and Dertouzos. Massachusetts Institute of Technology. Published 1978 (11 pgs).

*Primary Examiner* — Henry Tsang
(74) *Attorney, Agent, or Firm* — John P. Davis; Thayne and Davis LLC

(57) ABSTRACT

This disclosure relates to, among other things, electronic device security systems and methods. Certain embodiments disclosed herein provide for protection of cryptographic keys and/or associated operations using both an operating system security service and a software-based whitebox cryptographic security service executing on a device. Leveraging operating system security services and software-based whitebox cryptographic security services may provide enhanced security when compared to using either service alone to protect cryptographic keys and associated operations. In additional embodiments, server-side cryptographic security solutions may be further used to enhance device security implementations.

19 Claims, 7 Drawing Sheets

(58) Field of Classification Search
CPC ... H04L 2209/16; H04L 9/0822; H04L 9/085; H04L 9/003
See application file for complete search history.

(56) References Cited

U.S. PATENT DOCUMENTS

2016/0352518 A1* 12/2016 Ford ................. H04L 9/088
2019/0372780 A1* 12/2019 Messerges ............ H04L 9/3263
2021/0056548 A1* 2/2021 Monica .............. G06Q 20/3825

* cited by examiner

ENHANCED SECURITY SYSTEMS AND METHODS USING A HYBRID SECURITY SOLUTION

RELATED APPLICATIONS

This application claims benefit of priority under 35 U.S.C. § 119(e) to U.S. Provisional Patent Application No. 63/039,282, filed Jun. 15, 2020, and entitled "ENHANCED SECURITY SYSTEMS AND METHODS USING A HYBRID SECURE KEY BOX AND A HARDWARE SECURITY SOLUTION," which is incorporated herein by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for enhancing security in electronic devices. More specifically, but not exclusively, the present disclosure relates to systems and methods for enhancing security in electronic devices using a hybrid whitebox cryptographic and an operating system ("OS") security solution.

Many mobile device OSs include built-in security services such as, for example and without limitation, Secure Enclave in iOS and/or Keystore in Android, which may or may not be implemented using a secure enclave and/or secure hardware elements. OS security services often allow for the generation and/or importing of cryptographic keys. In addition to generating keys, OS security services may further enable applications to perform cryptographic operations using such keys without exporting the keys from the services by exposing invocable secure interfaces to the applications.

In some implementations, OS security services may be enabled using a hardware mechanism such as, for example and without limitation, a trusted execution environment ("TEE") included in a device. A TEE may comprise isolated and/or otherwise secure processing resources, which may be implemented using secure hardware, that deliver cryptographic functions and key protection services to the device. In at least one non-limiting example, OS security services may allow for private and secret keys to be created by and/or imported into a dedicated hardware chip and/or OS that may not be exported from the dedicated hardware and/or OS. These keys can be used to perform cryptographic functions, but as they are not exported, the security of the keys may be ensured. The OS may serve a role of the gatekeeper to decide which application(s) can access keys protected by the OS security services. If the OS is rooted/jailbroken, however, the OS's gatekeeper function may be nullified by a root privilege, and applications, which may include malware applications, and/or users of the device can access the keys secured by the OS security services.

With a whitebox cryptographic implementation such as, for example, a Secure Key Box ("SKB"), an application may have access to keys that remain encrypted. In some limited circumstances, if a nefarious actor were to undertake significant efforts, the keys may be compromised. The protection provided by software-based encryption and cryptographic protection schemes may only be as strong as the level of security of the whitebox implementation. On the other hand, since a SKB itself may not rely on the OS's function as a gatekeeper, even when the OS is rooted/jailbroken, the keys protected by an SKB will still be secure and may not be accessed by other applications in the device or by users of the device.

Embodiments of the disclosed systems and methods provide for an encryption scheme that combines the additional security provided by OS security services (e.g., Secure Enclave, Keystore, etc.), software-based whitebox security solutions (e.g., SKB), and/or dynamic protection using server-side cryptography so that keys stored on devices are not jeopardized. Various embodiments may enable an SKB and its protected data to be bound to a specific device to prevent it from being copied and used on another device.

Consistent with embodiments disclosed herein, keys and/or other cryptographic operations, which may include private signing keys and associated digital signature operations, may be protected by using OS security services, software-based whitebox cryptographic security service, and/or server-side cryptographic protection schemes that employ a nonce. In some embodiments, private keys may be encrypted by a software-based cryptographic security module such as an SKB. The encrypted private keys may be further encrypted using keys associated with an OS security service. In further embodiments, the encrypted private keys may be further protected using a nonce which may be encrypted by a server service. By interacting with the server service, the OS security service, and/or the software-based cryptographic module, an application executing on a device may decrypt a private key and use the key to perform cryptographic operations (e.g., signing operations) within a protected environment (e.g., an SKB).

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Device Architecture

Figure 1:
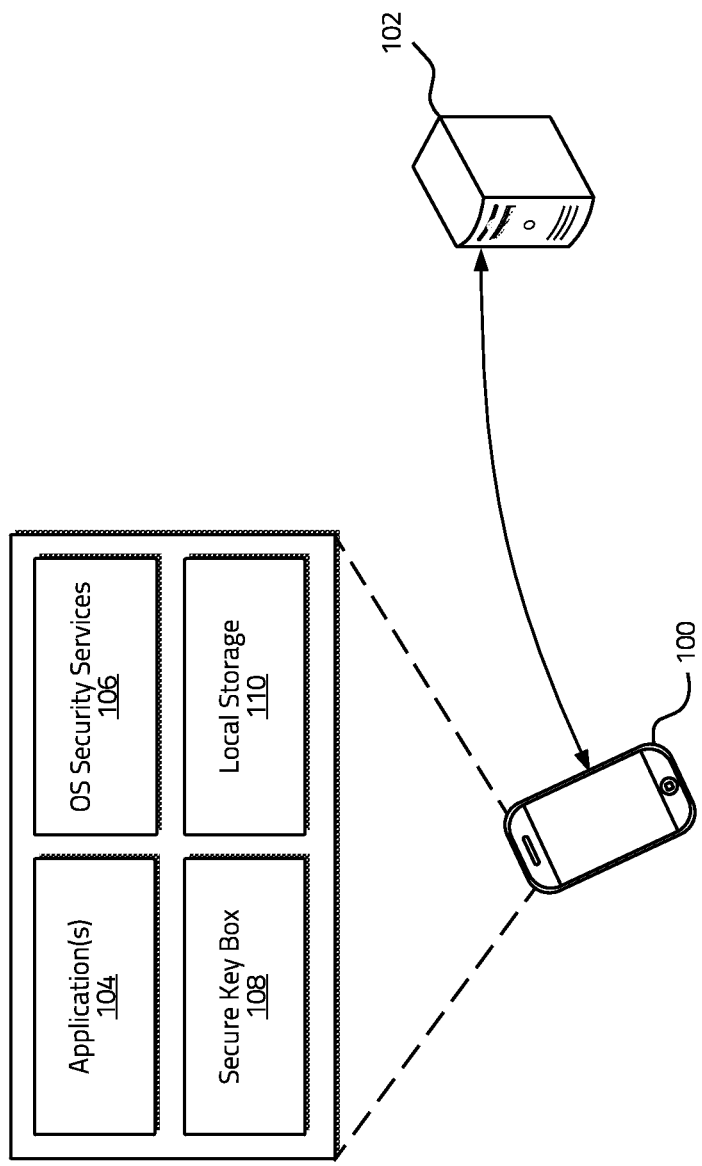
FIG. 1 illustrates a simplified example of an architecture of a device consistent with certain embodiments disclosed herein.

Various embodiments disclosed herein provide for a hybrid key and/or secure information protection scheme that uses both OS security services and software-based security solutions such as whitebox cryptographic security solutions. FIG. 1 illustrates a simplified example of an architecture of a device 100 consistent with certain embodiments of the present disclosure. In various embodiments, cryptographic techniques may be used to enable secure communication of information between the device 100 and a server 102. The device 100 and/or server 102 and/or one or more other associated systems and/or services may comprise a variety of computing devices and/or systems, including any computing system or systems suitable to implement embodiments of the various systems and methods disclosed herein. For example without limitation, the device 100, server 102, and/or one or more other associated systems and/or services may comprise one or more laptop computer systems, desktop computer systems, server computer systems, distributed computer systems, set top boxes, media devices, mobile devices, smartphones, tablet computers, vehicle control and/or other associated computer systems, and/or any other type of computing system and/or device.

Although the device 100 is illustrated in the figures as a smartphone device and the server 102 as a server computer system, it will be appreciated that various aspects of the disclosed embodiments are not limited to these device types and/or systems and/or devices and/or systems in the illustrated configuration, nor are certain disclosed embodiments limited to a device and server configuration in a traditional sense. Indeed, embodiments described herein may be used in connection with enabling cryptographic operations performed by and/or secure communications between any type (s) of computing systems operating in a variety of roles, including as peers.

In certain embodiments, the device 100, server, 102, and/or one or more other associated systems and/or services may comprise at least one processor system configured to execute instructions stored on an associated non-transitory computer-readable storage medium. As discussed in more detail below, the device 100, server 102, and/or other associated systems and/or services may further comprise a TEE and/or a secure processing unit ("SPU") that may be configured to perform sensitive operations such as trusted credential and/or key management, secure policy management, and/or other aspects of the systems and methods disclosed herein. In various embodiments, a TEE and/or a SPU may comprise and/or otherwise interface with secure hardware resources that may deliver cryptographic, key protection, and/or other secure information management services.

The device 100, server 102, and/or other associated systems and/or services may further comprise software and/or hardware configured to enable electronic communication of information between the devices and/or systems via a network using any suitable communication technology, standard, and/or combinations thereof. The user device, server system, and/or one or more other systems and/or services may be communicatively coupled using a variety of networks and/or network connections. In certain embodiments, the network connections may comprise a variety of network communication devices and/or channels and may utilize any suitable communications protocols and/or standards facilitating communication between the device 100, server 102, and/or one or more other systems and/or services.

The network connections may comprise Internet, a local area network, a virtual private network, and/or any other communication network connections utilizing one or more electronic communication technologies and/or standards (e.g., Ethernet or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network connections and/or a digital mobile communications network connections utilizing, for example and without limitation, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may utilize IEEE's 802.11 standards, Bluetooth®, ultra-wide band ("UWB"), Zigbee®, and/or any other suitable standard or standards.

As illustrated, the device 100 may comprise one or more applications 104 executing in a processing environment of the device 100, which may be an open processing environment and/or a protected, secure, and/or otherwise trusted processing environment such as TEE. The device 100 may further include local storage 110 configured to store various information and/or data generated and/or used by the device 100, including protected and/or otherwise encrypted information and/or data.

In various embodiments, the device 100 may comprise OS security services 106 that may provide various key management and/or cryptographic services to the device 100. For example, in an iOS device, the OS security services 106 may comprise a Secure Enclave service. In an Android device, the OS security services 106 may comprise a Keystore service. It will be appreciated, however, that other types of OS security systems 106 may also be employed in connection with various disclosed embodiments.

OS security services 106 may enable the device 100 and/or one or more applications 104 executing thereon to generate and/or import cryptographic keys and/or to perform cryptographic operations using such keys and/or other secure operations without exporting and/or otherwise exposing the keys outside the OS security services 106. In certain embodiments, the OS security services 106 may expose defined secure application programming interfaces ("APIs") that may be invoked by the one or more applications 104 to perform various key management and cryptographic services within the OS security services 106.

In various embodiments, OS security services 106 may be enabled using a hardware mechanism such as, for example and without limitation, a secure element implemented using secure hardware. In further embodiments, OS security services 106 may be implemented by a TEE and/or other secure enclave that may be implemented by a generic processor but incorporate protections in memory management and/or data flow. In at least one non-limiting example, OS security services 106 may allow for private and secret keys to be created and/or imported into a dedicated hardware chip and/or OS security service 106 that may not be exported from the dedicated hardware and/or OS security service 106.

The device 100 may further comprise a SKB 108 and/or another software-based cryptographic and/or security service. In various embodiments, the SKB 108 may comprise a whitebox cryptographic security implementation that may protect and/or perform cryptographic functions such as key generation, encryption, digital signature generation, key agreement, and/or key wrapping services. Secret keys may remain encoded and/or otherwise encrypted by the SKB 108 without appearing in memory of the device in the clear, even during execution of associated cryptographic services and/or use of the secure keys.

Consistent with embodiments disclosed herein, keys and/or other cryptographic operations, which may include private signing keys and associated digital signature operations, may be protected by using the OS security service 106, the SKB 108, and/or the server 102. For example, in some embodiments, private keys may be encrypted by a the SKB 108. The encrypted private keys may be further encrypted by using keys associated with the OS security service 106. In additional embodiments, the encrypted private keys may be further be protected using a nonce which may be encrypted by a server 102. By interacting with the server 102, the OS security service 106, and/or the SKB 108, an application 104 executing on the device 100 may decrypt a private key and use the key to perform cryptographic operations (e.g., signing operations) within the SKB 108.

Certain security solutions may check for the existence of OS security services 106. In such implementations, however, the resulting check may be manipulated by an attacker so that the security solution relies solely on the software solution (e.g., the SKB 108). To mitigate this risk of manipulation, in certain embodiments, the proposed security selection may be restricted to OS versions where an OS security service 106 is consistently available.

Key Generation and Exchange

Figure 2:
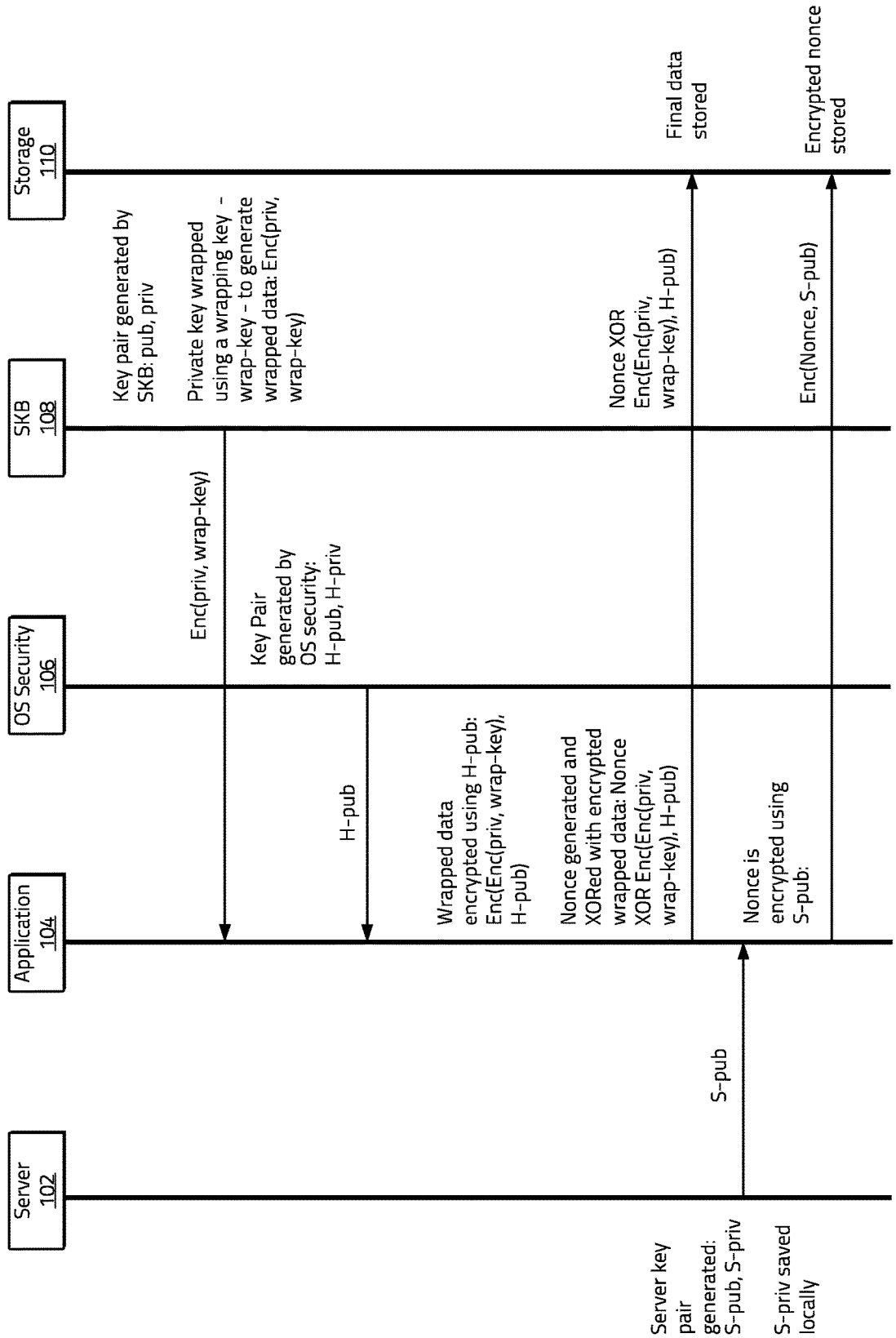
FIG. 2 illustrates an example of a key generation and exchange process consistent with certain embodiments disclosed herein.

FIG. 2 illustrates an example of a key generation and exchange process consistent with embodiments of the present disclosure herein. Aspects of the illustrated process may be performed by and/or in conjunction with software, hardware, firmware, and/or any combination thereof. In certain embodiments, various aspects of the illustrated key generation process may involve, for example and without limitation, a server system 102, a client device executing an application 104 and comprising an OS security service 106 (e.g., Keystore, Secure Enclave, and/or the like), a whitebox cryptographic software solution such as an SKB 108, and/or local storage 110.

Although various examples illustrated and described in connection with FIG. 2 and elsewhere herein may utilize a Keystore implementation as an OS security service 106 and a SKB software-based cryptographic security module 108 for the purposes of explanation and illustration, it will be appreciated that other types of OS security services and/or software-based cryptographic security services (e.g., other whitebox cryptographic security services) may also be used in connection with the disclosed embodiments. As shown, operations for generating and/or exchanging keys between the illustrated components and/or services may include:

An SKB 108 may generate a public and private key pair: pub, priv. The private key may be wrapped by the SKB 108 using a wrapping key: wrap-key. In some embodiments, wrapping the private key may comprise encrypting the private key with the wrapping key, denoted in the figures Enc(priv, wrap-key). The wrapped private key—Enc(priv, wrap-key)—may be communicated to the application 104 by the SKB 108. In various embodiments, the wrapping key may be previously generated by the SKB 108. In further embodiments, the wrapping key may be generated by the SKB 108 as part of the public and private key pair generation process. In certain embodiments, the wrapping key may comprise a key protected by whitebox cryptographic methods. In further embodiments, in addition to and/or alternatively to wrapping the private key to protect the key, whitebox protection techniques may be employed to protect the private key.

The OS security service 106 (e.g., Keystore) may generate a public and private key pair: H-pub, H-priv. In some embodiments, the public and private key pair may be previously generated and/or stored by the OS security service 106. The public key—H-pub—may be communicated to the application 104 by the OS service 106.

The application 104 may encrypt the wrapped data using the public key received from the OS security service 106, denoted in the figures as Enc(Enc(priv, wrap-key), H-pub). In various embodiments, this encryption process may be performed in the clear and/or without significant protection of the cryptographic processes. Consistent with various aspects disclosed herein, performing this encryption in the clear may not necessarily be a threat because the corresponding private key—H-priv—may remain encrypted and/or be securely stored.

A nonce may be generated by the application 104 (e.g., randomly generated, pseudorandomly generated, and/or otherwise generated to achieve a specified level of randomness) and the encrypted wrapped data may then be XORed with the nonce: Nonce XOR Enc(Enc(priv, wrap-key), H-pub). The encrypted wrapped data XORed with the nonce may be communicated from the application 104 and stored in local storage 110.

The server 102 may generate (and/or have previously generated) a public and private server key pair: S-pub, S-priv. The server 102 may locally store the private key—S-priv—and communicate the public server key—S-pub—to the application 104 executing on the device.

The application 104 may encrypt the nonce using the received public server key. The encrypted nonce may be communicated from the application 104 and stored in local storage 110.

Private Key Use and Data Signature

Figure 3:
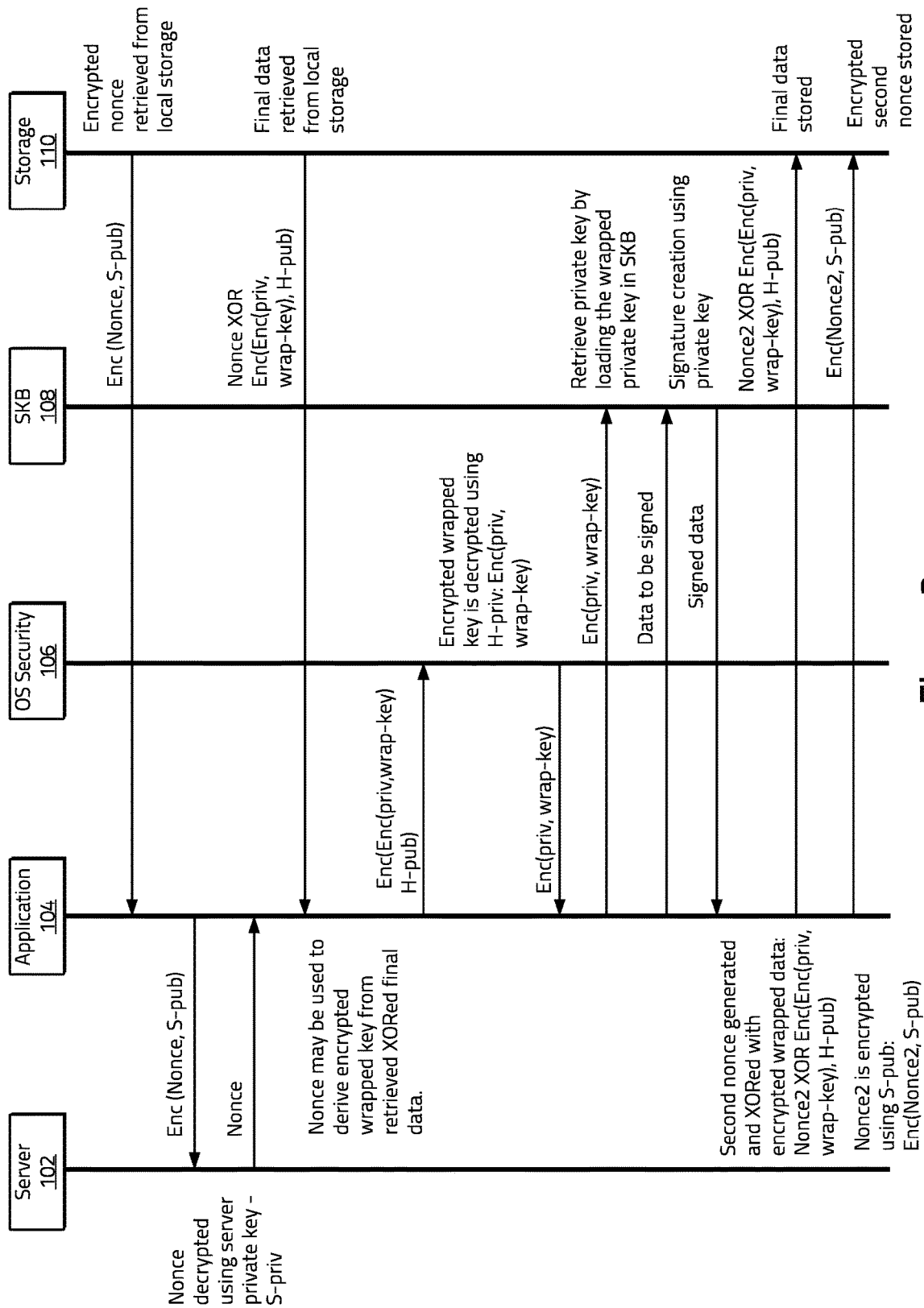
FIG. 3 illustrates an example of a signature process consistent with certain embodiments disclosed herein.

FIG. 3 illustrates an example of a signature process consistent with embodiments of the present disclosure. Aspects of the illustrated process may be performed by and/or in conjunction with software, hardware, firmware, and/or any combination thereof. In certain embodiments, various aspects of the illustrated digital signature generation process may involve, for example and without limitation, a server system 102 a client device executing an application 104 and comprising an OS security service 106 (e.g., Keystore, Secure Enclave, and/or the like), a whitebox cryptographic software solution such as an SKB 108, and/or local storage 110.

Consistent with various embodiments disclosed herein and the example illustrated in connection with FIG. 3, operations for using a private key for digital signature processes may include:

- The encrypted nonce—Enc(nonce, S-pub)—may be retrieved from the local storage 110 by the client application 104 and sent to the server 102 for decryption. The server 102 may decrypt the encrypted nonce with the server's corresponding private key—S-Priv—and may send a reply containing the decrypted nonce to the client application 104. In some embodiments, the decrypted nonce may be securely communicated to client application 104 (e.g., using encrypted communication channels and/or the like)
- The application 104 may retrieve the final data XORed and stored by local storage 110, which in certain embodiments herein may be referred to as a "private key package" and/or derivatives of the same—that is: Nonce XOR Enc(Enc(priv, wrap-key), H-pub). The decrypted nonce may be used to derive the encrypted wrapped private key from the retrieved XORed data. The application 104 may then send the derived encrypted wrapped private key data—Enc(Enc(priv, wrap-key), H-pub)—to the OS security services 106.
- The OS security services 106 may decrypt the encrypted wrap key using its private key—H-priv—which may be protected by the OS security services 106 to generate the wrapped key: Enc(priv, wrap-key). The OS security services 106 may communicate the wrapped private key to the client application 104.
- The SKB 108, which may operate in a secure enclave and/or a rich execution environment, may load the wrapped private key and unwrap the private key by decrypting the wrapped private key using the wrapping key managed by the SKB 108, resulting in a whitebox protected private signing key.
- The application 104 may communicate data to be signed using the private key to the SKB 108. The SKB 108 may then sign the data using the private key and return the signed data to the application 104.
- A second nonce, which may be different than the original nonce, may be generated by the application 104 (e.g., randomly generated) and the encrypted wrapped private key may then be XORed with the second nonce: Nonce2 XOR Enc(Enc(priv, wrap-key), H-pub), generating a new private key package. The encrypted wrapped data XORed with the second nonce may be communicated from the application 104 and stored in local storage 110.
- The application 104 may encrypt the second nonce using the public server key previously received from the server 102. The encrypted second nonce may be communicated from the application 104 and stored in local storage 110.

Although the various examples presented in connection with FIG. 2 and FIG. 3 are described in connection with OS security services 106 supporting Keystore, similar processes may be applied to devices supporting a Secure Enclave as well as other devices employing other operating systems and/or similar secure cryptographic processing environments that may be hardware based.

Hybrid Security Mechanism Protections

Various embodiments of the disclosed hybrid security mechanism may protect a private key under several potential threat scenarios. For example and without limitation, various disclosed embodiments may, in some implementations, protect a private key in one or more of following scenarios:

- Protected by OS Security Services: An attacker may need to break the OS security services (e.g., rooting/jailbreaking) to access an associated private key.
- Protected by SKB: An attacker may execute dynamic attacks (e.g., side channel attacks) towards a software-based whitebox cryptographic protection implementation on the device and/or another preferred environment.
- Protected by a Hybrid of SKB and OS Security Services: An attacker may execute dynamic attacks (e.g., side channel attacks) towards a whitebox cryptographic implementation on the device. Typical attacks against whitebox cryptographic methods may not be successful, however, because the private key may also be protected with the OS security services available on the device.
- Protected by a Hybrid of SKB and OS Security using a Nonce: An attacker may execute dynamic attacks (e.g., side channel attacks) towards a whitebox cryptographic implementation on the device. Typical attacks against whitebox cryptographic methods may not be successful, however, because the private key may also be protected with the OS security services available on the device. Even if an attacker were to break the OS security services, the private key may remain protected with the nonce, and the nonce value may be protected with a server secret key while stored on the device. An attacker may thus need to identify the mechanism and security of the nonce on memory against an implementation protected with obfuscation and anti-debugging.

In the above manner, embodiments of the disclosed hybrid solution may provide improved security than relying only OS security services protection or only on whitebox cryptographic protection. In some embodiments, the disclosed systems and methods may enable the secure binding of the SKB and its application to a particular device, which may enhance the security of the implementation. For example, in certain embodiments, fingerprint and/or other device specific information may be provided to a SKB implementation used to generate binding keys associated with the SKB. In at least one non-limiting example, device identification information associated with and/or derived from device hardware and/or operating environment details may be combined with a SKB export key to create a unique format for keys exported from the SKB. An SKB instance that imports keys may require the same export key and/or the same device identification information as a SKB instance that exported the key.

With the increasing prevalence of device OS security services that may be associated with hardware encryption systems, such as Secure Enclave and/or Keystore, leveraging additional security provided by the OS security services alongside a software-based security solution such as a whitebox cryptographic implementation (e.g., SKB) may be beneficial. Embodiments of the hybrid scheme may thus be more secure than relying simply on the OS security services and/or simply on software-based security solutions, both of which may have certain vulnerabilities.

Private Key Protection Using Multiple Secure Modules

In various embodiments, a private key may be protected using multiple (e.g., two) secure modules on a client, which may comprise and/or otherwise be implemented using cryptographic security service modules such an SKB. In some embodiments, a "split key" and/or "secret sharing" technique may be employed where two (or more) secure modules operate independently on separate keys, and the results of their efforts may be combined to produce a final signature. In some embodiments, a homomorphic cipher may be employed in connection with a signature operation employing split key and/or secret sharing techniques such as, for example and without limitation, a homomorphic public key cryptosystem like Rivest-Shamir-Adleman ("RSA").

Consistent with embodiments disclosed herein, a software-based cryptographic security service such as, for example and without limitation, an SKB, may implement a plurality of secure modules to perform various operations using cryptographic keys. In further embodiments, multiple software-based cryptographic security service implementations (e.g., multiple SKBs) may be employed to implement split key and/or secure sharing techniques in connection with cryptographic operations consistent with various aspects of the disclosed systems and methods. In further embodiments, at least one secure module used connection with in a "split key" technique may comprise a secure hardware element, which may diversify the security strength of private key protection techniques associated software and/or hardware protections consistent with various aspects of the disclosed embodiments.

Key Provisioning Methods

Figure 4:
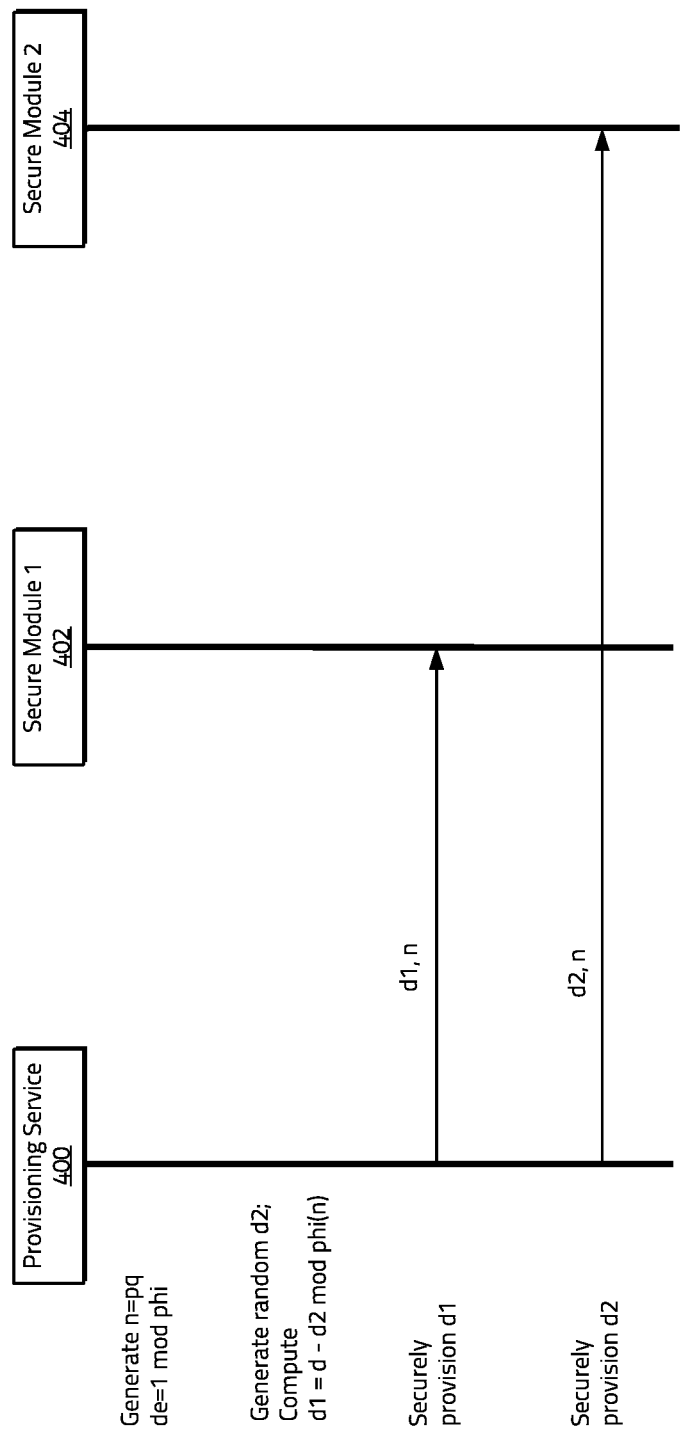
FIG. 4 illustrates an example of a split key provisioning method consistent with certain embodiments disclosed herein.

A variety of key provisioning methods may be employed in connection with a split key and/or secret sharing technique consistent with embodiments disclosed herein. FIG. 4 illustrates an example of a split key provisioning method consistent with certain embodiments disclosed herein. As shown, a provisioning service 400, which may comprise an external provisioning service, may generate an RSA key n=pq and may compute the private exponent d. The provisioning service 400 may further generate a random number d2, and compute d1=d—d2 mod phi(n).

The provisioning service 400 may separately provision the two key shares (d1, n) and (d2, n) to the two modules 402, 404. For example, as illustrated, the provisioning service may provide a first secure module 402 with a first key share (d1, n) and a second secure module 404 with a second key share (d2, n). In various embodiments, standard provisioning protocols may be employed by the provisioning service 400 to provision the respective key shares to the secure modules 402, 404. In certain embodiments where a SKB is used, a key export tool may be used. The result may be two key shares d1 and d2 satisfying d=d1+d2 mod phi(n).

In another non-limiting example of a key provisioning method, a provisioning service may generate an RSA key n=pq and may compute the private exponent d. The provisioning service may further generate a random number d2, and compute d1=d*d2^(−1) mod phi(n).

The provisioning service 400 may separately provision the two key shares (d1, n) and (d2, n) to the two modules. For example, as illustrated, the provisioning service 400 may provide a first secure module 402 with a first key share (d1, n) and a second secure module 404 with a second key share (d2, n). In various embodiments, standard provisioning protocols may be employed by the provisioning service 400 to provision the respective key shares to the secure modules 402, 404. In certain embodiments where a SKB is used, a key export tool may be used. The result may be two key shares d1 and d2 satisfying d=d1*d2 mod phi(n).

In a further non-limiting example of a key provisioning method, a private key may be generated on a device if the device has not been compromised. A first secure module 402 may generate a private key (p, q) and the private exponent d. The first secure 402 module and a second secure module 404 may share a random value of d2 using authenticated key exchange. The first secure module 402 may compute and store d1 using any of the key splitting techniques described above, potentially destroying the private exponent d after use. This provisioning method may, however, be less secure if the first secure module 402 has been compromised.

Signature Operations Using RSA v1.5

Figure 5:
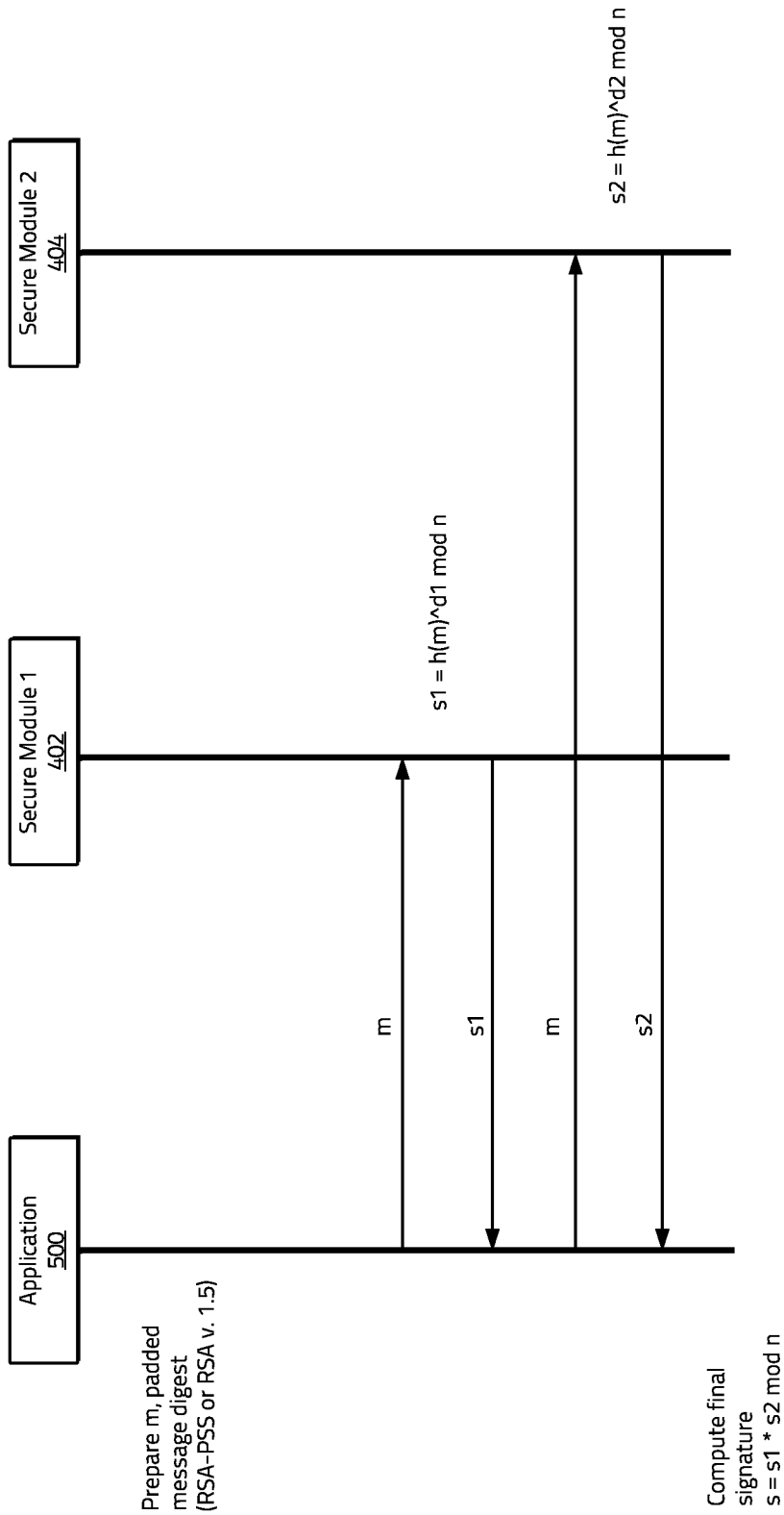
FIG. 5 illustrates an example of a signature process using a plurality of secure modules with certain embodiments disclosed herein.

Signature operations using a split-key consistent with various aspects of the disclosed embodiments may employ RSA 1.5 signing processes with a plurality of secure modules. FIG. 5 illustrates an example of a signature process using a plurality of secure modules 402, 404 with certain embodiments disclosed herein. In various embodiments, the RSA signing operation may use a modulus n=p*q, for two large prime numbers p and q, a private exponent d, and a public exponent e. In some embodiments, the exponents e and d may satisfy the equation d*e=1 mod phi(n), where phi(n)=(p−1)*(q−1). The RSA v1.5 signature s of a message m may be expressed as the value s=h(m)^d mod n, wherein h(m) may be the deterministically encoded message specified in Public Key Cryptography Standards #1 v. 2.2 Request for Comments 8017 ("PKCS #1 v. 2.2 (RFC 8017)").

A provisioning service may provision a plurality of secure modules 402, 404 with key shares d1 and d2 satisfying d=d1+d2 mod phi(n). For example, a first key share d1 may be provisioned to a first secure module 402 and a second key share d2 may be provisioned to a second secure module 404. A message m may be generated by the application 500, which may comprise a padded message digest (e.g., an RSA probabilistic signature scheme ("RSA-PSS") and/or an RSA v. 1.5 padded message digest). The application 500 may communicate the message to the plurality of secure modules 402, 404.

The first secure module 402 may calculate a first signature s1 based the message m and the key share d1. The second secure module 404 may calculate a second signature s2 based on the message m and the key share d2. In various embodiments, signatures s1 and s2 may be calculated according to:

$$s1 = h(m)^{d1} \bmod n$$

$$s2 = h(m)^{d2} \bmod n$$

Due to the homomorphic nature of the RSA cipher, a final signature may be obtained by the application 500 by multiplying the two signatures:

$$s = s1 * s2 \quad \bmod n$$
$$= h(m) \ ^\wedge \ (d1 + d2) \bmod n$$

Signature Operations Using RSA-PSS

In various embodiments, a split-key signing method for RSA-PSS may use a standard RSA-PSS padded signing implementation within a first protection module, which may comprise a secure element with a tamper resistant random number generator, and a raw RSA implementation in another protection module, which may comprise an SKB.

The RSA-PSS signing operation may use a modulus n=p*q, for two large prime numbers p and q, a private exponent d, and a public exponent e. The exponents e and d may satisfy the equation d*e=1 mod phi(n), where phi(n)=(p−1)*(q−1).

The RSA-PSS signature s of a message m may be the value s=h(m)^d mod n. Here, h(m) may be the probabilistically encoded message specified in PKCS #1 v2.2 (RFC 8017).

The secure modules may be pre-provisioned with two key shares d1 and d2 satisfying d=d1*d2 mod phi(n). The method may calculate sequentially the intermediate signature and the final signature:

$$s1 = h(m) \wedge d1 \quad \mod n$$
$$s = s1 \wedge d2 \quad \mod n$$
$$= h(m) \wedge (d1 * d2) \mod n$$

RSA—Optimal Asymmetric Encryption Padding ("RSA-OAEP") or RSA v1.5 Decryption Methods A variety of methods may be used in connection with RSA-OAEP and/or RSA v1.5 decryption processes consistent with embodiments disclosed herein.

In some embodiments, a first non-limiting example of a split-key RSA decryption process may use secure software modules that implement raw (e.g., unpadded) RSA decryption. The RSA decryption operation may use a modulus n=p*q, for two large prime numbers p and q, a private exponent d, and a public exponent e. The exponents e and d may satisfy the equation d*e=1 mod phi(n), where phi(n)=(p−1)*(q−1).

The RSA decryption m of a ciphertext c may be the value m=f(c^d mod n). Here, f(x) may be the deterministic RSA-OAEP and/or RSA v1.5 decoding function specified in PKCS #1 v2.2 (RFC 8017).

A provisioning service may provision the secure modules with two key shares d1 and d2 satisfying d=d1+d2 mod phi(n). For example, a first secure module may be provisioned with a first key share d1 and a second secure module may be provisioned with a second key share d2. The method may calculate within the two separate modules, potentially in parallel, the two intermediate plaintexts x1 and x2:

$$X1 = c \wedge d1 \mod n$$
$$x2 = c \wedge d2 \mod n$$

The final plaintext message m may be obtained by multiplying and decoding within the application:

$$m = f(x1 * x2) \quad \mod n)$$
$$= f(c \wedge (d1 + d2) \mod n)$$

Another non-limiting example of a split-key RSA decryption process may use one secure module that implements raw (e.g., unpadded) RSA decryption, and another secure module, which may comprise a secure enclave, that implements padded RSA decryption. The RSA decryption operation may use a modulus n=p*q, for two large prime numbers p and q, a private exponent d, and a public exponent e. The exponents e and d may satisfy the equation d*e=1 mod phi(n), where phi(n)=(p−1)*(q−1).

The RSA decryption of a ciphertext c may be the value m=f(c^d mod n). Here, f(x) may be the deterministic RSA-OAEP or RSA v1.5 decoding function specified in PKCS #1 v2.2 (RFC 8017).

The secure modules may be pre-provisioned with two key shares d1 and d2 satisfying d=d1*d2 mod phi(n). For example, a first secure module may be provisioned with a first key share d1 and a second secure module may be provisioned with a second key share d2. The method may calculate sequentially the intermediate plaintext and final plaintext:

$$x1 = c \wedge d \quad \mod n$$
$$m = f(x1 \wedge d2 \quad \mod n)$$
$$= f(c \wedge (d1 * d2) \mod n).$$

Various embodiments of the disclosed split key and or secret sharing techniques may allow for improved security when combing the security strength of software and/or hardware-based security techniques (e.g., certain OS security services) and software cryptographic services (e.g., an SKB). For example, hybrid security techniques consistent with embodiments disclosed herein may utilize split key arrangements to split keys between hardware-based security solutions (which may include certain OS security services) and/or software cryptographic services such as an SKB. In at least one non-limiting example, a secure enclave may operate as a first secure module computing a first part of a signature and an SKB may operate as a second secure module computing a second part of a signature which may be combined to generate a final signature. In further embodiments, multiple SKBs and/or software cryptographic services and/or multiple hardware-based security services may be used to implement split key cryptographic operations.

It will be appreciated that a number of variations can be made to the architecture and relationships presented in connection with FIGS. 1-5 within the scope of the inventive body of work. For example and without limitation, in some embodiments, some or all of the functions performed by a device, server, application, service, and/or associated modules may be performed by another device, server, application, service, and/or associated modules and/or combinations thereof and/or one or more other services. Thus it will be appreciated that FIGS. 1-5 are provided for purposes of illustration and explanation, and not limitation.

Figure 6:
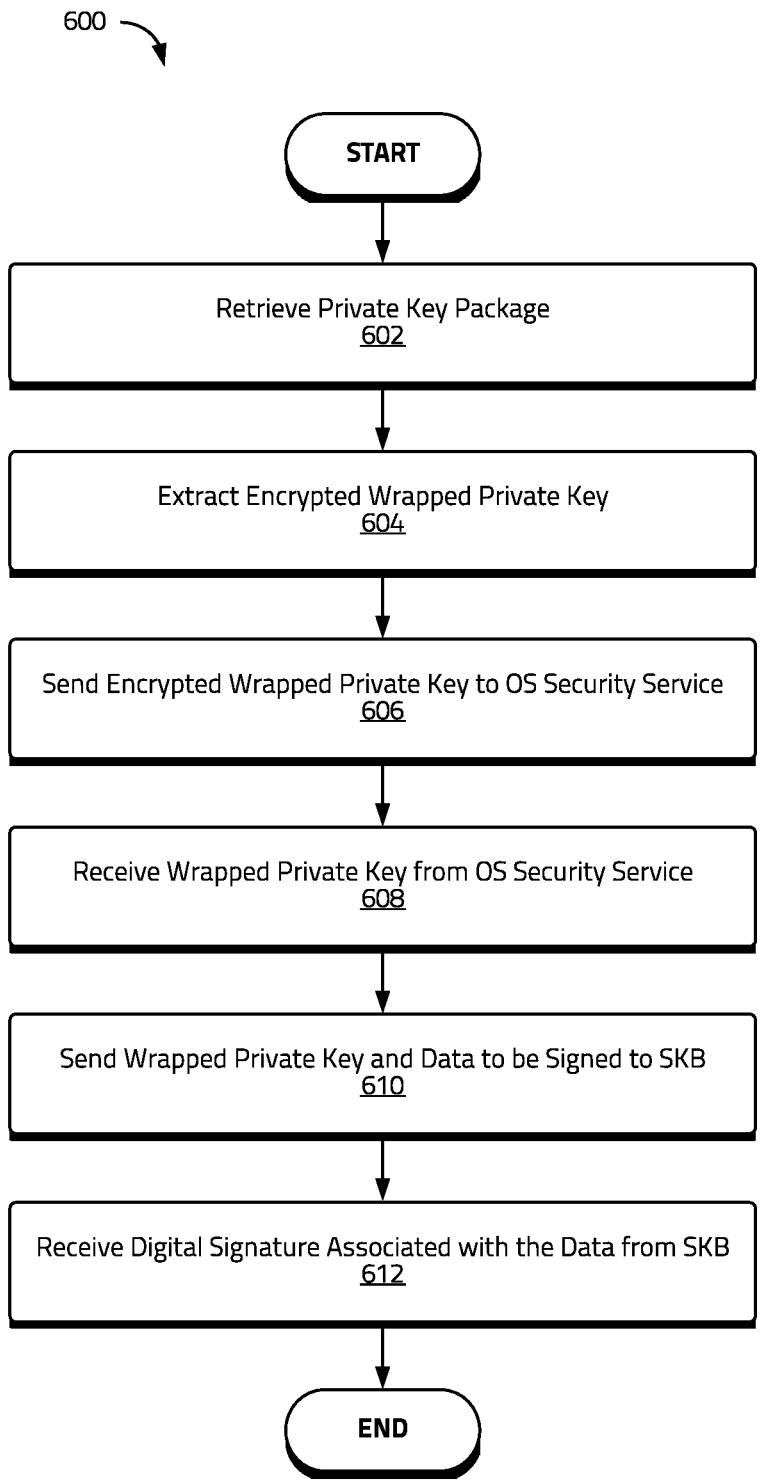
FIG. 6 illustrates a flow chart of an example of a method for digitally signing data consistent with certain embodiments of the present disclosure.

FIG. 6 illustrates a flow chart of an example of a method 600 for digitally signing data consistent with certain embodiments of the present disclosure. The illustrated method 600 and/or aspects thereof may be performed by and/or in conjunction with software, hardware, firmware, and/or any combination thereof. In various embodiments, the method 600 may be performed by a device implementing OS security services and/or software cryptographic services such as an SKB.

At 602, an application executing on the device may retrieve a private key package from storage, which in some embodiments may comprise local storage associated with the device. In certain embodiments, the private key package may be generated based on a first nonce and an encrypted wrapped private key. For example and without limitation, the private key package may comprise the first nonce XORed with the encrypted wrapped private key. In further embodiments, a nonce may not be employed, and the private key package may simply comprise the encrypted wrapped private key.

The encrypted wrapped private key may be extracted from the private key package at 604. In some embodiments, extracting the encrypted wrapped private key may be performed using the first nonce and the private key package. In certain embodiments, to access and/or otherwise use the first nonce, the method 600 may comprise retrieving an encrypted first nonce (e.g., encrypted using a public key of a server service) from the storage associated with the device. The encrypted first nonce may be sent to a server system for decryption using a private key of the server system, and the decrypted first response may be returned by the server system to the device.

At 606, the encrypted wrapped private key may be sent to an OS security service of the device. The OS security service may comprise, for example and without limitation, a Secure Enclave and/or a Keystore service. In some embodiments, the OS security service may be supported and/or otherwise be implemented using secure hardware.

The OS security service may return to the application a wrapped private key at 608. For example, in some embodiments, the encrypted wrapped private key may be encrypted using a public key associated with the OS security service and the service may decrypt the encrypted wrapped private key using its corresponding private key and transmit the resulting wrapped private key to the application.

At 610, the application may send the wrapped private key to a software cryptographic service associated with the device, which in some embodiments may comprise a whitebox cryptographic service such as a SKB, for unwrapping. In some embodiments, the wrapped private key may comprise a private signing key encrypted using a wrapping key associated with the software cryptographic service. In addition, the application may send data to be digitally signed to the software cryptographic service.

The software cryptographic service may unwrap and/or otherwise decrypt the wrapped private key using the wrapping key to generate the private signing key. The software cryptographic service may sign the data and/or otherwise generate a corresponding digital signature using the private signing key. The signed data and/or digital signature may be to the application at 612.

Figure 7:
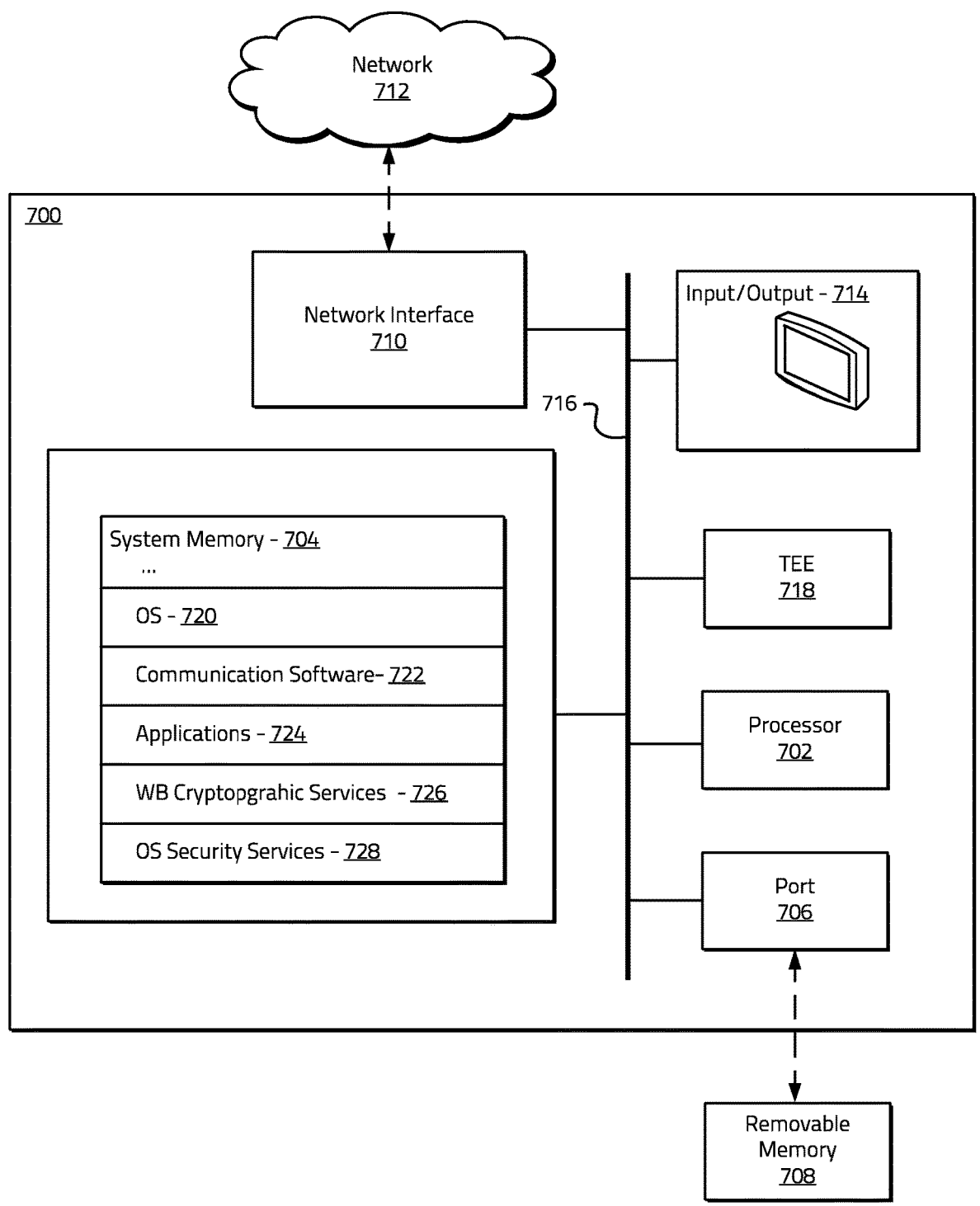
FIG. 7 illustrates a system that may be used to implement certain embodiments of the systems and methods of the present disclosure.

FIG. 7 illustrates a system 700 that may be used to implement certain embodiments of the systems and methods of the present disclosure. Aspects of the system 700 may be included in a device, a server, and/or any other system and/or service configured to implement embodiments of the disclosed systems and methods. As illustrated in FIG. 7, the system 700 may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 706 for interfacing with removable memory 708 that may include one or more diskettes, optical storage mediums (e.g., flash memory, thumb drives, USB dongles, compact discs, DVDs, etc.) and/or other non-transitory computer-readable storage mediums; a network interface 710 for communicating with other systems via one or more network connections 712 using one or more communication technologies; a user interface 714 that may include a display and/or one or more input/output devices such as, for example, a touchscreen, a keyboard, a mouse, a track pad, and the like; and one or more busses 716 for communicatively coupling the elements of the system 700.

In some embodiments, the system 700 may, alternatively or in addition, include a TEE 718, a SPU, and/or other trusted and/or otherwise secure hardware that is protected from tampering by a user of the system 700 or other entities by utilizing secure physical and/or virtual security techniques. An TEE 718, a SPU, and/or other trusted and/or otherwise secure can help enhance the security of sensitive operations such as personal information management, trusted credential and/or key management, privacy and policy management, and other aspects of the systems and methods disclosed herein. In certain embodiments, the TEE 718, a SPU, and/or other trusted and/or otherwise secure may operate in a logically secure processing domain and be configured to protect and operate on secret information, as described herein. In some embodiments, the TEE 718, a SPU, and/or other trusted and/or otherwise secure may include internal memory storing executable instructions or programs configured to enable the TEE 718, a SPU, and/or other trusted and/or otherwise secure to perform secure operations, as described herein.

The operation of the system may be generally controlled by a processing unit 702 and/or a TEE 718, a SPU, and/or other trusted and/or otherwise secure operating by executing software instructions and programs stored in the system memory 704 (and/or other computer-readable media, such as removable memory 708). The system memory 704 may store a variety of executable programs or modules for controlling the operation of the system. For example, the system memory 704 may include an OS 720 that may manage and coordinate, at least in part, system hardware resources and provide for common services for execution of various applications. The system memory may further include, without limitation, communication software 722 configured to enable in part communication with and by the system, applications 724, software cryptographic services (e.g., whitebox cryptographic services such as an SKB) 726, OS security services 728 such as, for example and without limitation, a Secure Enclave and/or Keystore service, and/or any other information, modules, and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, devices, services, and/or components presented in connection with the figures and/or associated description within the scope of the inventive body of work, and that the examples presented in the figures are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for digitally signing data performed by a device comprising a processor and non-transitory computer-readable medium storing instructions that, when executed by the processor, cause the device to perform the method, the method comprising:

retrieving, by an application executing on the device, a first private key package from storage associated with the device;

extracting, from the first private key package, an encrypted wrapped private key;

sending, by the application to an operating system security service associated with the device, the encrypted wrapped private key for decryption;

receiving, by the application from the operating system security service, a wrapped private key;

sending, by the application to a software cryptographic service associated with the device, the wrapped private key for unwrapping;

sending, by the application to the software cryptographic service, data to be signed by the software cryptographic service; and receiving, by the application from the software cryptographic service, a digital signature associated with the data generated using a private signing key generated at least in part by decrypting the wrapped private key.

2. The method of claim 1, wherein the encrypted wrapped private key is encrypted using a public key associated with the operating system security service.

3. The method of claim 2, wherein the method further comprises decrypting, by the operating system security service, the encrypted wrapped private key using a private key associated with the operating system security service.

4. The method of claim 1, wherein the software cryptographic service comprises a whitebox protected cryptographic service.

5. The method of claim 4, wherein the whitebox protected cryptographic service comprises a secure key box service.

6. The method of claim 1, wherein the wrapped private key comprises the private signing key encrypted using a wrapping key associated with the software cryptographic service.

7. The method of claim 6, wherein the method further comprises decrypting, by the software cryptographic service, the wrapped private key using the wrapping key to generate the private signing key.

8. The method of claim 1, wherein the method further comprises retrieving, by the application, an encrypted first nonce from the storage associated with the device.

9. The method of claim 8, wherein the method further comprises sending, by the application, the encrypted first nonce to a server service for decryption.

10. The method of claim 9, wherein the encrypted first nonce is encrypted using a public key associated with a server service.

11. The of claim 10, wherein the method further comprises, receiving, from the server service, the decrypted first nonce.

12. The method of claim 11, wherein the first private key package is generated based, at least in part, on the first nonce and the encrypted wrapped private key.

13. The method of claim 12, wherein the first private key package comprises the first nonce XORed with the encrypted wrapped private key.

14. The method of claim 13, wherein the extracting of the encrypted wrapped private key is based on the decrypted first nonce received from the server service and the first private key package.

15. The method of claim 10, wherein the method further comprises generating a second nonce.

16. The method of claim 15, wherein the method further comprises encrypting the second nonce using the public key associated the server service and transmitting the encrypted second nonce to the server service.

17. The method of claim 16, wherein the method further comprises generating a second private key package based on the second nonce and the encrypted wrapped private key and transmitting the second private key package to the storage associated with the device.

18. The method of claim 17, wherein the first private key package comprises the second nonce XORed with the encrypted wrapped private key.

19. The method of claim 1, wherein the storage associated with the device comprises local storage associated with the device.

* * * * *